US008789688B2

(12) United States Patent
Zoni

(10) Patent No.: US 8,789,688 B2
(45) Date of Patent: Jul. 29, 2014

(54) SUPPORT STRUCTURE FOR CONTAINER HANDLING MACHINES

(75) Inventor: Roberto Zoni, Parma (IT)

(73) Assignee: Sidel S.p.A., Parma (IT)

( * ) Notice: Subject to any disclaimer, the term of this patent is extended or adjusted under 35 U.S.C. 154(b) by 69 days.

(21) Appl. No.: 13/384,679

(22) PCT Filed: Jul. 21, 2009

(86) PCT No.: PCT/IT2009/000325
§ 371 (c)(1), (2), (4) Date: Jan. 18, 2012

(87) PCT Pub. No.: WO2011/010331
PCT Pub. Date: Jan. 27, 2011

(65) Prior Publication Data

US 2012/0111701 A1 May 10, 2012

(51) Int. Cl.
*B65G 21/00* (2006.01)
*B67C 3/22* (2006.01)
*B67C 7/00* (2006.01)

(52) U.S. Cl.
CPC .. *B67C 3/22* (2013.01); *B67C 7/002* (2013.01)
USPC ...................... 198/860.2; 198/860.1; 248/639

(58) Field of Classification Search
CPC ......... B65G 21/02; B65G 21/00; F16M 13/00
USPC ........................... 248/639; 198/860.01, 860.2
See application file for complete search history.

(56) References Cited

U.S. PATENT DOCUMENTS 3,913,331 A * 10/1975 Conwell ......................... 60/692
6,276,113 B1 * 8/2001 Bernhard ........................ 53/253
7,114,535 B2 * 10/2006 Hartness et al. .............. 141/145
7,182,115 B2 * 2/2007 Sindermann et al. ......... 156/363
7,404,277 B2 * 7/2008 Schach et al. ................ 53/136.1
7,731,022 B2 * 6/2010 Zepf .......................... 198/860.1
7,743,907 B2 * 6/2010 Weinbrenner et al. ..... 198/459.2
2003/0075547 A1 4/2003 Stocchi
2005/0188651 A1 * 9/2005 Clusserath ................... 53/136.1
2006/0245673 A1 * 11/2006 Lupi ............................ 383/119
2010/0101183 A1 * 4/2010 Beisel ............................. 53/276
2011/0101183 A1 * 5/2011 Ernst et al. ................. 248/216.1
2011/0233376 A1 * 9/2011 Cavazzini Gainotti et al. ............................. 248/639

FOREIGN PATENT DOCUMENTS

| | | | |
|---|---|---|---|
| DE | 20 2007 017932 | U1 | 10/2008 |
| EP | 1 707 530 | A1 | 10/2006 |
| WO | 01/59354 | A1 | 8/2001 |
| WO | 2006/087088 | A2 | 8/2006 |
| WO | 2006/087109 | A1 | 8/2006 |

* cited by examiner

*Primary Examiner* — Ramya Burgess
*Assistant Examiner* — Thomas Randazzo
(74) *Attorney, Agent, or Firm* — Pearne & Gordon LLP

(57) ABSTRACT

A Support structure (1; 200) for container handling machines, comprising a single-piece assembled table (2; 202) having a first wall (3; 203) provided with a plurality of first support housings (53; 253) and a second wall (4; 204) opposite to said first wall (3; 203) with respect to a plane (P) of reference of said table (2; 202). Said second wall (4; 204) is provided with a plurality of second support housings (54; 254) arranged in a mirror-like manner to said first support housings (53; 253) with respect to said plane (P) of reference, the first and second support housings being alternatively associable to a handling machine or to a floor-standing bearing (5; 155), whereby the support structure (1; 200) can be overturned for defining altered layouts.

11 Claims, 8 Drawing Sheets

SUPPORT STRUCTURE FOR CONTAINER HANDLING MACHINES

TECHNICAL FIELD AND BACKGROUND ART

The present invention relates to a support structure for container handling machines such as rinsers, filling and capping/seaming machines.

The invention is particularly referred to bottling plants wherein star wheel conveyors and rotating platforms or carousels have to be supported and linked in a structure. In a first prior art, the star wheels are supported on a pre-drilled solid/massive table in such a way that the positions of the star wheels and of the rotating platforms are fixed and predetermined.

The main advantage of said solid/massive table is its own great structural rigidity that assures a sturdy support to the star wheels, thus enabling the latter to rotate at high speed.

On the other hand, said solid/massive table has the important drawback of being custom-made and hence not adaptable to more than one layout of a bottling plant. In particular, since from the manufacturing and pre-drilling steps, it is necessary acknowledged whether the bottling plant envisages a clockwise or a counter-clockwise layout and then manufacturing and pre-drilling the table accordingly. Therefore, after the manufacturing and pre-drilling steps, the layout of the bottling plant is set and cannot be reversed without throwing away the table just created.

According to a second prior art disclosed in document WO 2006/087088, a tubular structure is known. This document shows in-feed and out-feed star wheels arranged to be driven on column-shaped support housings. Each support housing comprises lateral connection interfaces to which a joint end of a connecting bar is detachably attached, to the other joint end being detachably connected to a connection interface of a further support housing or to a machine chassis, such that the star wheel configuration, defining the container transport paths, may be modularly varied.

According to a third prior art disclosed in document WO 2006/087109, a pre-table system for container handling machines is known. In the pre-table, the support housing is fixed to a floor-standing support structure having a tube and/or profile section frame directly or indirectly detachably connected to each other at jointing points, such that the star wheel configurations may be varied. The support housings are arranged in a free-standing manner such that free areas are formed around the support housings.

The second and third prior art disclosed in documents WO 2006/087088 and WO 2006/087109 encompass the following important drawback. The column-shaped support housings (according to the second prior art) or the floor-standing support structure having a tube and/or profile section frame (according to the third prior art) define a whole support structure, or basement, having a very low stiffness. Hence, in order not to over-load the basement, the star wheels cannot rotate at high speed, namely above a limiting-speed.

DISCLOSURE OF THE INVENTION

An aim of the present invention is to avoid the above drawbacks making available a support structure for container handling machines having a great stiffness and simultaneously able to enlarge the number of layouts attainable by the bottling plants.

A further aim of the present invention is to propose a support structure for container handling machines able to reduce the manufacturing costs.

Another aim is to make available a support structure for container handling machines able to contain wires and connections in a protected environment.

This and other aims are fully achieved by the support structure for container handling machines object of the present invention, which is characterized as in the appended claims.

BRIEF DESCRIPTION OF THE DRAWINGS

These and other aims will be more detailed in the following description of preferred embodiment, shown as mere example, in the annexed drawings, wherein.

BEST MODE FOR CARRYING OUT THE INVENTION

Figure 2:
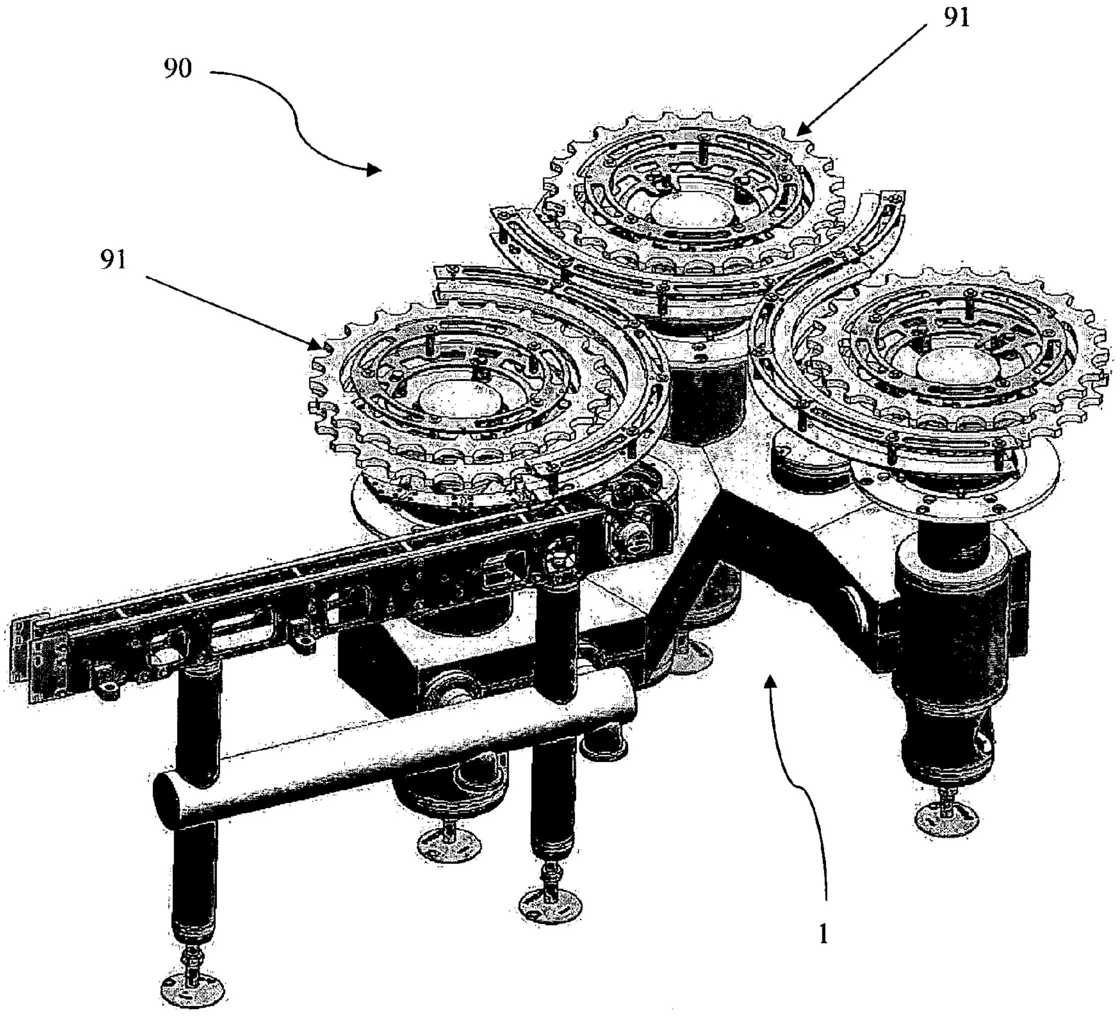
FIG. 2 illustrates a top perspective view of the first embodiment shown in FIG. 1 applied to a bottling plant.
Figure 3:
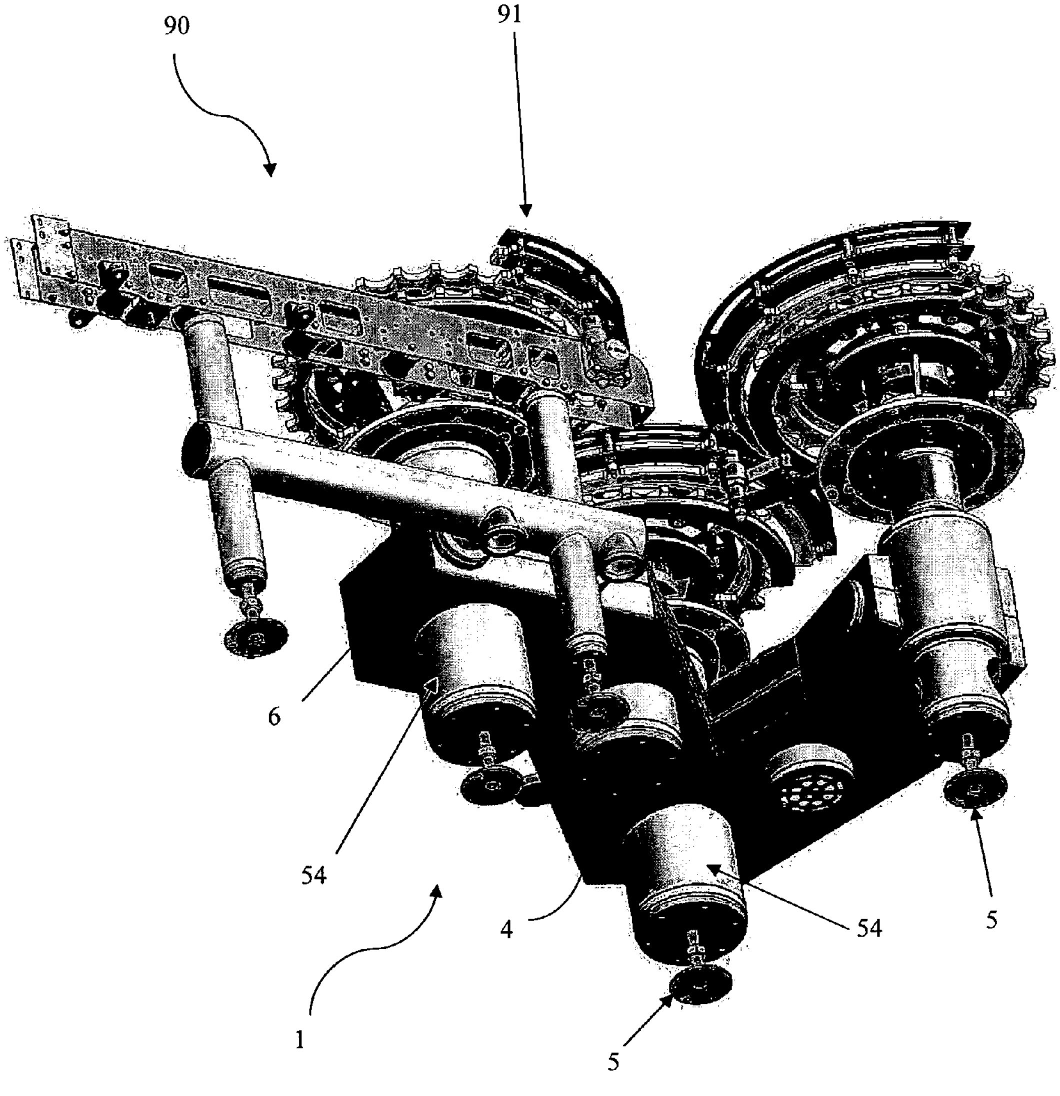
FIG. 3 illustrates a bottom perspective view of the first embodiment shown in FIG. 2.

With particular reference to FIGS. 2 and 3, there is represented a part of a bottling plant 90 comprising a plurality of handling machines 91 (only schematically illustrated) installed on a support structure 1 according to the present invention.

Figure 1:
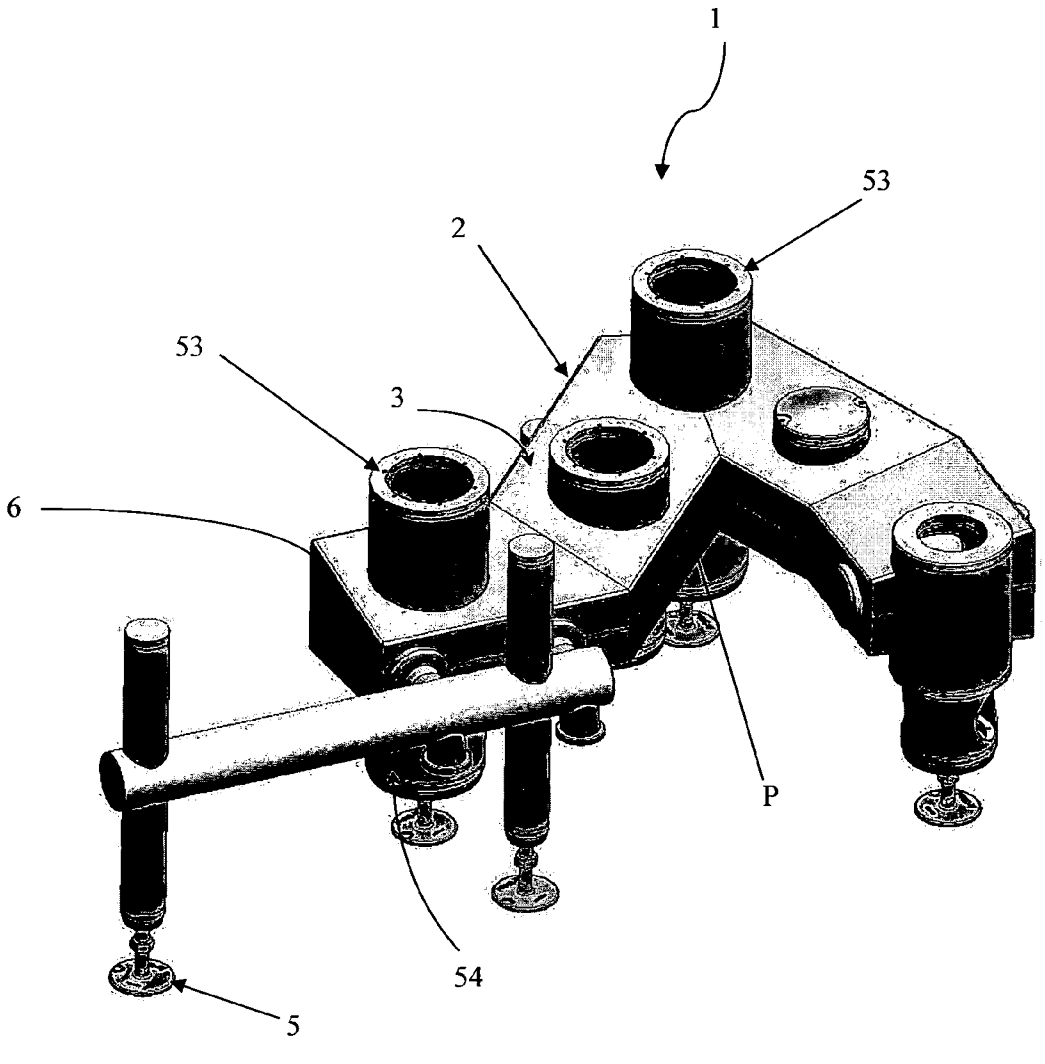
FIG. 1 illustrates a top perspective view of a first embodiment of a support structure according to the invention.
Figure 4:
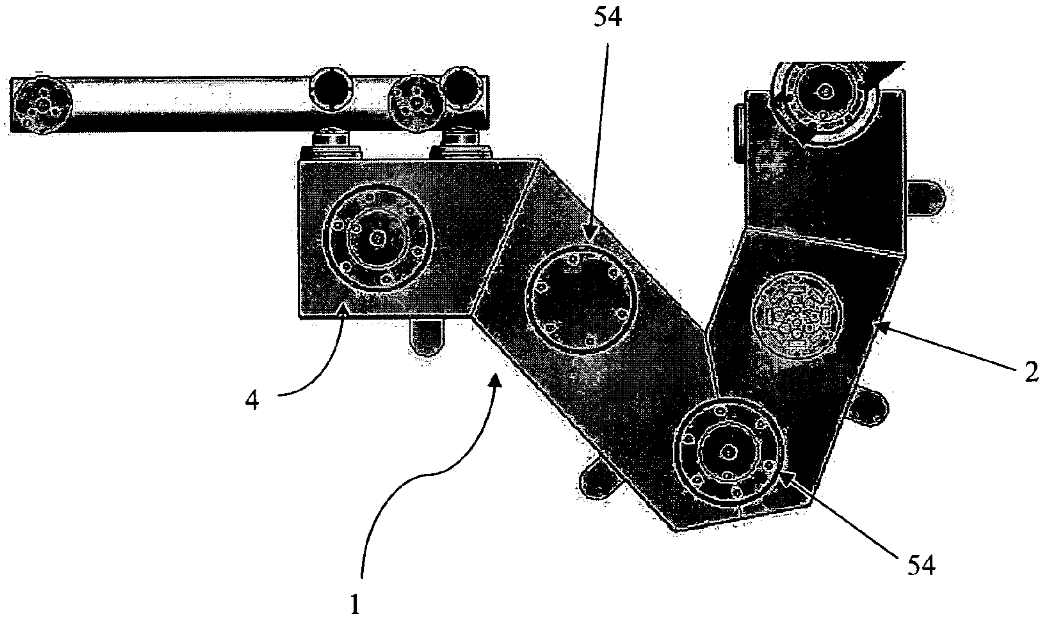
FIG. 4 illustrates a bottom plane view of the first embodiment shown in FIG. 1.

With special reference to FIGS. 1 and 4, the support structure 1 comprises a single-piece assembled table 2 having a first wall 3 provided with a plurality of first support housings 53 and a second wall 4 opposite to said first wall with respect to a plane of reference P of said table 2. In the first embodiment, said plane of reference P is the centre plane of the table.

Figure 5:
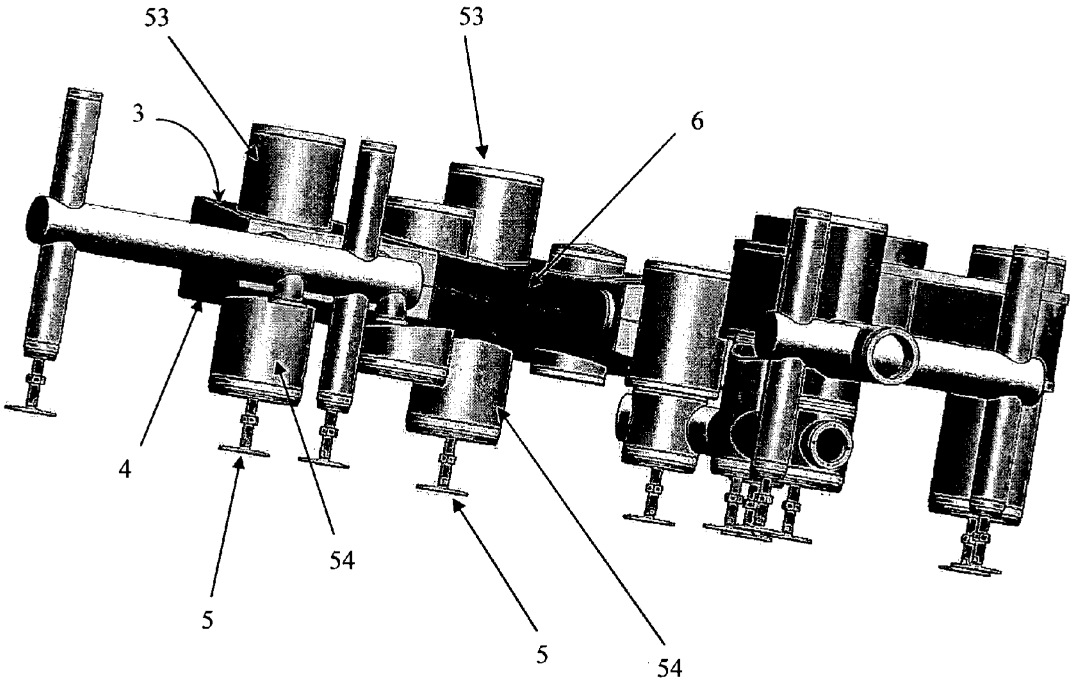
FIG. 5 illustrates a lateral view of the first embodiment shown in FIG. 1.

With particular reference to FIGS. 3, 4 and 5, said second wall 4 is provided with a plurality of second support housings 54 arranged in a mirror-like manner to said first support housings 53 with respect to said plane of reference P. The first and second support housings are alternatively associable to a handling machine 91 or to a floor-standing bearing 5 (such as a foot), whereby the support structure can be overturned for defining altered layouts.

In the first embodiment, the first support housings 53 are associated to the handling machines 91 and the second support housings are coupled to floor-standing bearings 5.

As it can be readily appreciate from FIGS. 3 and 4, the support structure 1 can be overturned. In particular, if each floor-standing bearing 5 is changed with a corresponding handling machine 91 and then the support structure is turned upside down, the bottling plant assumes a mirror-like layout.

Hence, a support structure according to the invention is advantageously able to enlarge the number of layouts attainable by the bottling plant. In particular, such a support structure, once manufactured, is readily adaptable to a clockwise or a counter-clockwise layout by virtue of a simple overturning.

A further advantage is that the support structure has a great stiffness, being made by a single-piece assembled table 2. Hence, the handling machine can work or rotate is at high speed, because such a support structure can absorb high loads induced by the vibrations or rotation of the handling machine.

Advantageously, such a support structure is able to reduce the manufacturing costs, since with few pre-manufactured support structures it is possible attain several layout. In fact, on the basis of desired layout, the support structure can be overturned and then the first and second support housings are connected to respective handling machines or floor-standing bearings. Preferably, the first and second support housings 53, 54 are semi-finished and they are completed as soon as it has been acknowledged the desired layout of the bottling plant.

In the embodiment shown in FIGS. 1, 3 and 5, said table 2 is a hollow structure comprising perimetrical walls 6 connected to said first and second walls 3, 4.

Advantageously, such a hollow support structure is able to contain wires and connections in a protected environment.

The hollow structure of the table 2 is preferably obtained by welding said first wall 3 and said second wall 4 to said perimetrical walls 6.

Preferably, said first and second walls 3, 4 have a sloping external surface.

Advantageously, the slope of the external surface prevents the accidental formation of liquid deposit on the wall right below the handling machine.

Figure 6:
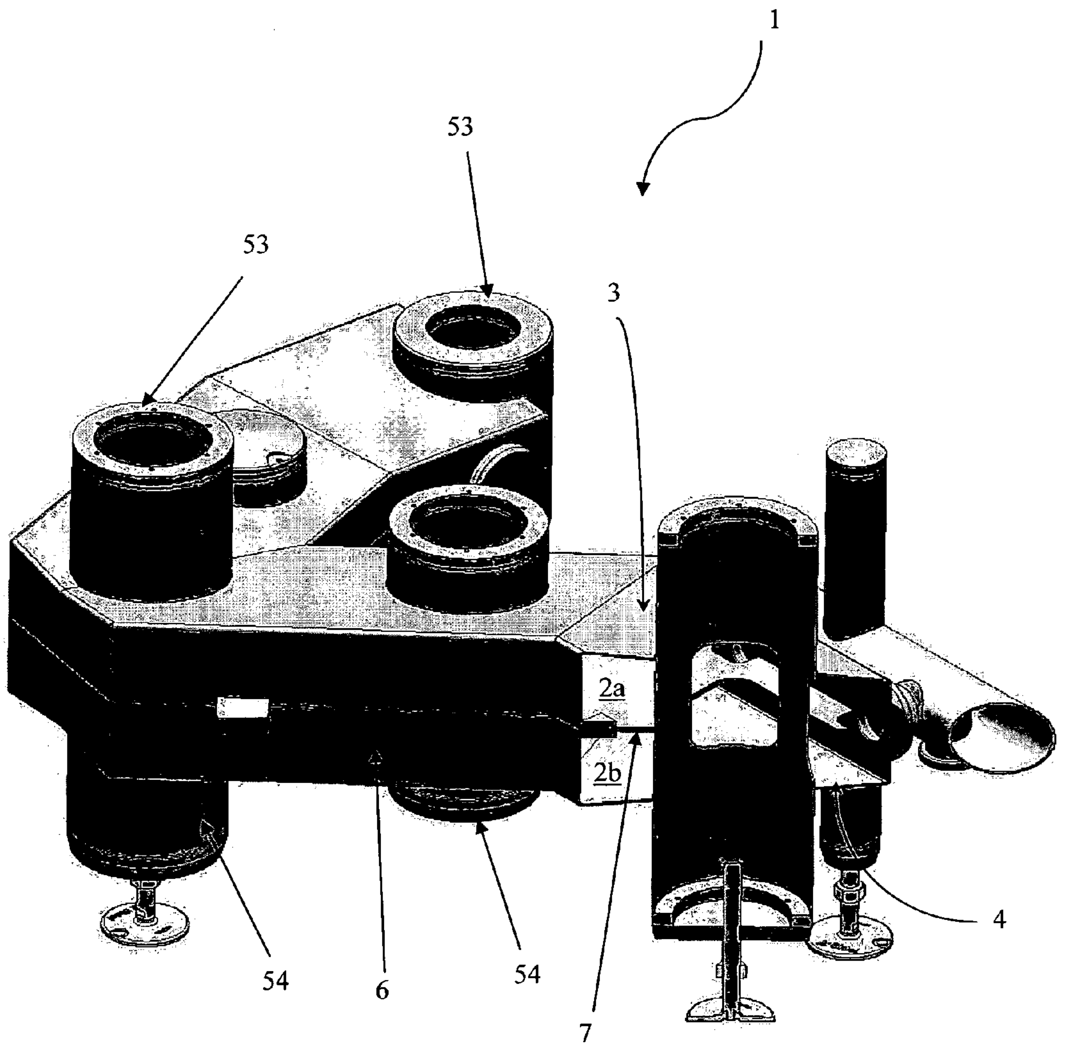
FIG. 6 illustrates a section view of a structural detail of the first embodiment shown in FIG. 1.

With specific reference to FIG. 6, preferably said perimetrical walls 6 have a substantially vertical external surface.

Advantageously, perimetrical walls with vertical external surface enhance the simplicity of fastening pipes, tubes etc. to the support structure.

With particular reference to the embodiment shown in FIG. 6, the support structure 1 comprises a diaphragm 7 arranged inside said table 2 to divide its internal volume into two partitions, a first partition 2*a* being obtained between said diaphragm 7 and said first wall 3 and a second partition 2*b* being obtained between said diaphragm 7 and said second wall 4.

Preferably, electric wires (not illustrated) for controlling and commanding the handling machines are arranged inside said first partition 2*a*, when the handling machines are installed on said first support housings 53, or inside said second partition 2*b*, when the handling machines are installed on said second support housings 54, the latter layout correspond to the support structure in overturned configuration with respect to the illustrated embodiments.

With particular reference to FIG. 6, said first partition 2*a* communicates with the external environment through said first support housings 53 and/or said second partition 2*b* communicates with the external environment through said second support housings 54.

Advantageously, the communication with the external environment enhances the simplicity of assembling the bottling plants and thus provides ergonomics to the support structure. In fact, an arm's operator can enter the table 2 through the support housing and thus comfortably operate on wires, connections etc.

With particular reference to FIGS. 1 and 4, said first support housings 53 and said second support housings 54 are aligned, respectively on the first and second walls, along a line of development of said table. In the illustrated embodiment, such a line is substantially S-shaped.

With specific reference to FIG. 4, a width of said table 2 across its line of development is substantially equal to a width of said first and second support housings 53, 54.

Advantageously, such a feature enhances the ergonomic of the support structure because it allows an operator to easily get near the handling machines in order to assemble/repair them.

Figure 7:
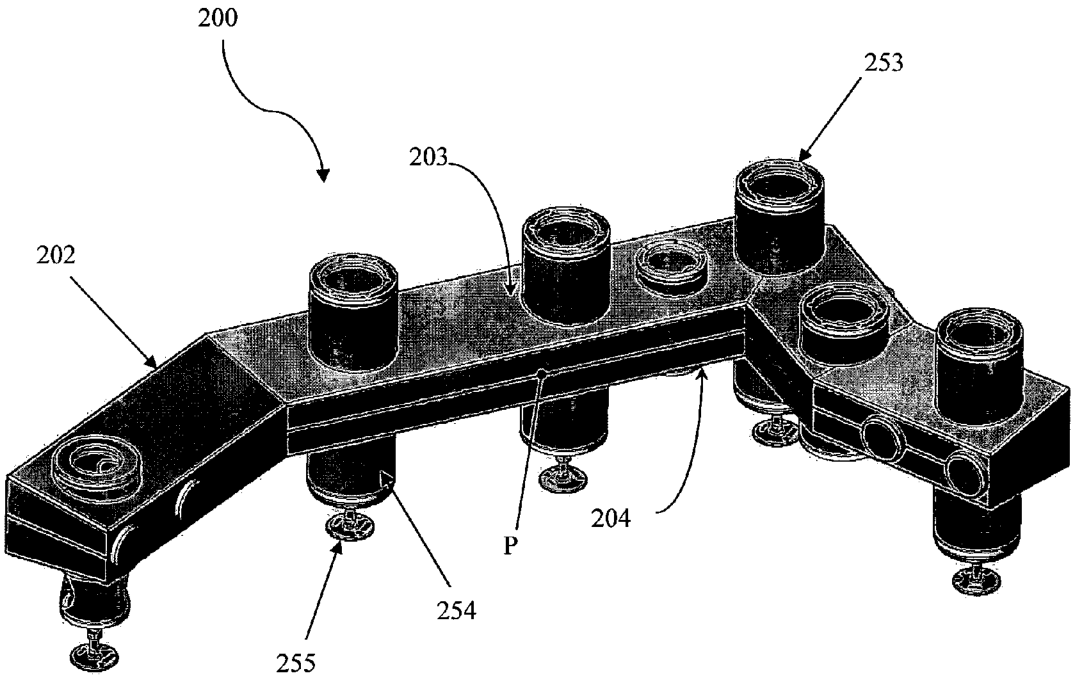
FIG. 7 illustrates a top perspective view of a second embodiment of a support structure according to the invention.
Figure 8:
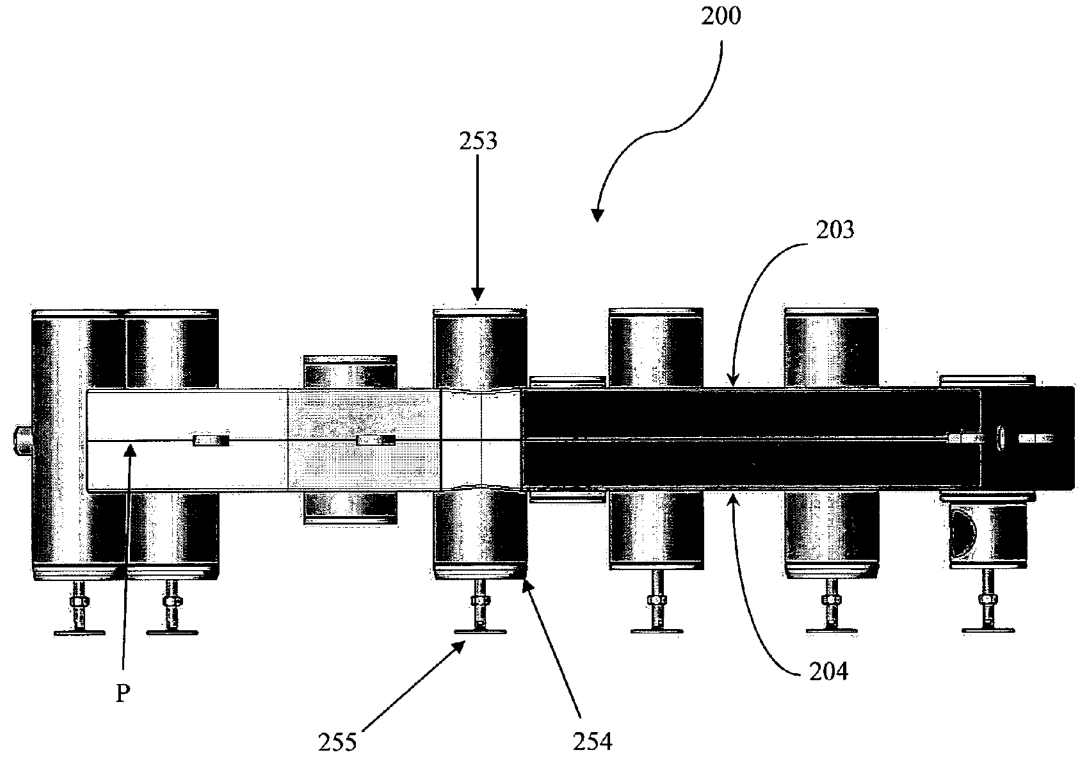
FIG. 8 illustrates a lateral view of the second embodiment shown in FIG. 7.

FIGS. 7 and 8 illustrate a second embodiment comprising all the features above described with reference to the first embodiment, except for the fact that the second embodiment has a different line of development.

According to the invention, the two embodiments herewith illustrated can be used to obtain four different layouts, because they can assume overturned positions in the manner described. Therefore, the invention allows a reduction of the manufacturing costs because the number of different support structures that must be produced for a given number of layouts is reduced.

Furthermore, the invention allows a reduction of the stocking costs, because it allows a reduction of the number of different pieces necessary to the obtention of a desired layout.

With special reference to FIGS. 7 and 8, the second embodiment comprises a support structure 200 comprising a single-piece assembled table 202 having a first wall 203 provided with a plurality of first support housings 253 and a second wall 204 opposite to said first wall with respect to a plane of reference P of said table 202. In the second embodiment, said plane of reference P is the centre plane of the table.

The second wall 204 is provided with a plurality of second support housings 254 arranged in a mirror-like manner to said first support housings 253 with respect to said plane of reference P. The first and second support housings are alternatively associable to a handling machine (not illustrated, but similar to that schematically shown in FIGS. 2 and 3) or to a floor-standing bearing 255, whereby the support structure can be overturned for defining altered layouts.

FIG. 8 clearly shows the mirror-like arrangement of said first and second support housings 253, 254.

The invention claimed is:

1. Support structure (1; 200) for container handling machines, comprising a single-piece assembled table (2; 202) having:

a first wall (3; 203) provided with at least three first support housings (53; 253); and a second wall (4; 204) opposite to said first wall (3; 203) with respect to a plane (P) of reference of said table (2; 202), characterized in that said second wall (4; 204) is provided with at least three second support housings (54; 254) arranged in a mirror-like manner to said first support housings (53; 253) with respect to said plane (P) of reference, the support structure (1; 200) having two different wall orientations, said two different wall orientations being a first wall up orientation and a second wall up orientation, in the first wall up orientation the first support housings (53; 253) being adapted and effective to support one or more portions of a container handling machine and the second support housings (54; 254) being adapted and effective to engage floor-standing bearings (5; 155) to effectively support the support structure (1; 200) on a floor, in the second wall up orientation the second support housings (54; 254) being adapted and effective to support one or more portions of a container handling machine and the first support housings (53; 253) being adapted and effective to engage floor standing bearings (5; 155) to effectively support the support structure (1; 200) on a floor.

2. Support structure according to claim 1, wherein said table (2) is a hollow structure comprising perimetrical walls (6) connected to said first and second walls (3, 4).

3. Support structure according to claim 2, comprising a diaphragm (7) arranged inside said table (2) to divide its internal volume into two partitions (2*a*, 2*b*), a first partition (2*a*) being obtained between said diaphragm (7) and said first wall (3) and a second partition (2*b*) being obtained between said diaphragm (7) and said second wall (4).

4. Support structure according to claim 3, wherein said first partition (2*a*) communicates with the external environment through said first support housings (53).

5. Support structure according to claim 3, wherein said second partition (2*b*) communicates with the external environment through said second support housings (54).

6. Support structure according to claim 2, wherein said first wall (3) and said second wall (4) are welded to said perimetrical walls (6).

7. Support structure according to claim 1, wherein said first and second walls (3, 4) have a sloping external surface.

8. Support structure according to claim 2, wherein said perimetrical walls (6) have a substantially vertical external surface.

9. Support structure according to claim 1, wherein said first support housings (53; 253) and said second support housings (54; 254) are aligned, respectively on the first and second walls (3, 4; 203, 204), along a line of development of said table (2; 202).

10. Support structure according to claim 9, wherein a width of said table (2; 202) across its line of development is substantially equal to a width of said first and second support housings (53, 54; 253, 254).

11. Support structure according to claim 3, wherein electric wires for controlling and commanding the handling machines are arranged inside said first partition (2a), when the handling machines are installed on said first support housings (53; 253), or inside said second partition (2b), when the handling machines are installed on said second support housings (54; 254).

* * * * *